United States Patent Office 3,106,482
Patented Oct. 8, 1963

3,106,482
ANTISTATIC TREATMENT FOR ACRYLONITRILE POLYMER FIBERS
Christiaan P. Van Dijk, Westfield, N.J., and Stanley A. Murdock, Concord, Calif., assignors to The Dow Chemical Company, Midland, Mich., a corporation of Delaware
No Drawing. Filed Jan. 23, 1961, Ser. No. 83,877
20 Claims. (Cl. 117—62.1)

This invention relates to a method for treating shaped articles comprised of synthetic hydrophobic polymeric materials, particularly those that may be comprised of polymers and copolymers of acrylonitrile, so as to overcome their propensity for accumulating static electrical charges. It has particular reference to a method of treating shaped articles that have been treated with certain agent having potential static build-up inhibiting properties.

Polyacryonitrile and various copolymers of acrylonitrile with other monoethylenicaly unsaturated monomeric materials, especially those containing at least about 80 percent by weight of acrylonitrile polymerized in the copolymer molecule, have many attractive properties which make them desirable for employment in various shaped articles including fibers, filaments, yarns, threads (and cloth and fabrics constructed therefrom), ribbons, tapes, foils, films, sheets and the like. Shaped articles from polymers and copolymers of acrylonitrile, however, exhibit an inordinate capacity for accumulating surface charges of static electricity. This characteristic makes them extremely difficult and unwiedly to manipulate and handle during various manufacturing operations and use applications. It also lessens their attractiveness in other aspects for being employed for many purposes. For example, many individuals may object to the latent electrical shocks they may be subject to or the sparks that may be discharged when the individuals serve as the effective grounding means for articles comprised of polymers and copolymers of acrylonitrile when there is a considerable accumulation of electrical charges on the articles. Furthermore, electrostatically charged articles comprised of polymers and copolymers of acrylonitrile display great tendencies to collect dust and dirt and to have undesirably high degrees of soil retentivity. This, of course, limits their adaptability for being utilized in a completely satisfactory manner for many apparel, upholstery, home furnishing, decorative and other uses.

Innumerable materials, treatments and techniques have been proposed, suggested and advanced to overcome or minimize the problems of static electrical charge accumulations on articles comprised of synthetic hydrophobic polymeric materials, particularly polymers and copolymers of acrylonitrile, which may be referred to as acrylic fibers by way of characterizing their polymeric or copolymeric origin.

The known treatments are generally defective or deficient in various particulars. Thus, many materials and finishes intended for application as antistatic agents are not sufficiently substantive for or adherescent on articles comprised of polymers and copolymers of acrylonitrile so that it may be difficult to suitably apply them to such articles and to realize satisfactory or substantial degrees of permanence after their application. Such features may be particularly pronounced for materials which contain various sulfonic groups. Unfortunately, the typical sulfonic group-containing materials (which frequently have exceptional effectiveness as antistatic agents) have great water solubility. This renders them easily susceptible to removal during aqueous manufacturing treatments or subsequent laundering or dry cleaning of the synthetic fiber articles on which they may be applied.

Furthermore, some antistatic agents have an undesirable influence on the hand or feel to the touch of the textile materials with which they are utilized. In addition, a great number of the known antistatic materials require that complex procedures be practiced for their application. The cost of their utilization may be significantly amplified thereby. It would be advantageous to provide an improved and more beneficial antistatic agent and treatment for acrylic fibers.

Therefore, it is among the principal objects of the present invention to provide a method for treating articles comprised of polymers and copolymers of acrylonitrile, to improve their resistivity for developing or accumlating static electrical charges and simultaneously improve their dye receptivity.

It is also among the principal objects of the present invention to provide an improved antistatic agent that will remain in effective association with acrylic fibers after its application despite repeated and rigorous subjection to aqueous treatments, washing, laundering and dry cleaning.

It is among the additional objects of the invention to provide articles comprised of polymers and copolymers of acrylonitrile, including fibers and the like and cloth and fabrics constructed therefrom, which result from such a treatment.

It is a predominating objective of the present invention to accomplish these intendments without detraction from or deletion of the other desirable characteristics and properties of acrylic fibers and other related articles comprised of polymers and copolymers of acrylonitrile.

Still further objects, advantages and benefits of the invention will be apparent in the following description and specification.

According to the invention, shaped articles comprised of particularly polymers and copolymers of acrylonitrile, may be rendered less propense to accumulate static electrical charges by treating them with an application of an antistatic agent comprised of a graft ternary polymer of a polymer substrate of certain N-vinyl heterocyclic compounds upon which is graft polymerized a mixture of certain monofunctional monomeric acrylate and methacrylate monoesters of polyglycols that have non-reactive end groups and certain polymerizable carboxylic acids. After the graft ternary polymer has been applied or incorporated in the shaped article, the free acid form of the carboxylic acid is at least partially converted to an alkali metal salt.

Advantageously, the antistatic agent can be applied during the manufacturing operations in the course of preparing an acrylic fiber. Articles treated in accordance with the present invention retain the antistatic ternary polymer in a substantially permanent manner through normal usage of the material. They have excellent antistatic properties and may be handled and employed readily without difficulties due to accumulations of static electricity. Furthermore, articles in accordance with the present invention retain their essential characteristics, including hand, and have an undiminished receptivity for other desired treatments which may be calculated and intended to enhance other of their properties, including dye-receptivity.

The graft ternary polymer antistatic agent compositions that are utilized in the practice of the instant invention comprise (A) a base or trunk polymer selected from the group consisting of polymerized N-vinyl lactams (including polymerized N-vinyl-3-morpholinones), and polymerized N-vinyl-2-oxazolidinones of the respective formula:

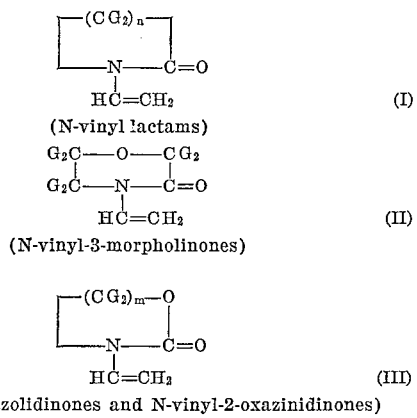

(N-vinyl lactams) (I)

(N-vinyl-3-morpholinones) (II)

and (N-vinyl-2-oxazolidinones and N-vinyl-2-oxazinidinones) (III)

wherein each G is independently selected from the group consisting of hydrogen and alkyl radicals of from 1 to about 4 carbon atoms; $n$ is an integer from 3 to 5; and $m$ is an integer from 2 to 3; upon which there is graft polymerized (B) a mixture of a monomeric polyglycol monoester of the formula:

$$CH_2=CZCO(OC_2H_4)_n(OC_3H_6)_mX \quad (IV)$$

wherein Z is selected from the group consisting of hydrogen and methyl; X is selected from the group consisting of halogens of atomic number 17 to 53 (i.e., chlorine, bromine and iodine), alkoxy radicals containing from 1 to 2 carbon atoms (i.e., $-OCH_3$ and $-OC_2H_5$) and thioalkyl radicals containing from 1 to 2 carbon atoms (i.e., $-SCH_3$ and $-SC_2H_5$); $n$ is a number having an average value of from 5 to 100; and $m$ is a number that includes zero and has an average value that may be as large as 10; and, C a polymerizable mono-ethylenically unsaturated aliphatic mono- and dicarboxylic acid monomer containing from 3 to about 12 carbon atoms in the monomer molecule.

Accordingly, this invention takes advantages of the anomaly that exceedingly superior antistaticity is imparted to the articles treated with the above indicated ternary polymer additaments if the free acid form of the ternary polymer is converted, at least in part, to an alkali metal salt. In other words, converting the acid form to the salt form after incorporating the antistatic agent in or on the shaped article is necessary to take full benefit and realize ultimate utility in practice of the invention. Commensurate good results are generally not obtained if the alkali metal salts of the acids are utilized during the polymerization to form the graft ternary polymer. Nor are they obtained if the acid form of the ternary polymer is converted or neutralized to the alkali metal salt form prior to administering or applying the tenary polymer antistatic agent to the shaped article.

Without being limited to or by the specific embodiments and modes of operation set forth, the invention is illustrated in and by the following didactic examples wherein, unless otherwise indicated, all parts and percentages are to be taken on a weight basis.

EXAMPLE 1

About 60 grams of N-vinyl pyrrolidone in 240 grams of water (using 0.6 gram of azoisobutyronitrile (AIBN) and 1.2 grams sodium acetate as catalyst) were polymerized under a nitrogen atmosphere at 70–100° C. After the polymerization reaction died out (observed by temperature decrease), a continuous run was started by pumping in a mixture of 64 grams of N-vinyl pyrrolidone, 26.2 grams of the methacrylate ester of a polyethylene glycol monomethyl ether (the polyethylene glycol constituent having an average molecular weight of about 1200), 3.5 grams acrylic acid, 0.6 gram AIBN, 1.2 grams sodium acetate and 180 grams of water at a rate of 200 ml. per hour. The volume of the reacting liquid was kept constant by pressuring out the additional amounts via a dip tube. After four hours of continuous running the effluent of the reactor was considered to be representative enough for steady state operation. The polymerizing reaction was continued for an additional two hours, the effluent of which was combined with the reactor contents and the reaction continued at 70° C. for six hours from which a uniform graft ternary polymer composition was obtained.

EXAMPLE 2

According to the procedure of Example 1, another polymer was made excepting to substitute N-vinyl-3-morpholinone for the N-vinyl pyrrolidone.

EXAMPLE 3

Similarly, and following the procedure of Example 1, another polymer was made excepting this time to substitute N-vinyl-5-methyl-2-oxazolidinone for N-vinyl pyrolidinone.

*Example 4*

Polyacrylonitrile fibers containing about 9 percent, based on the dry weight of the fiber (owf.), of the polymer product of Example 1 were prepared by impregnating filamentary structures that were in aquagel condition (after having been salt-spun and wet-stretched) in and with a dissolved aqueous dispersion of the graft copolymer that contained about 2.0 percent polymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 300 individual 10 mil diameter orifices into an aqueous coagulating bath that contained about 43 percent of dissolved zinc chloride to form a multiple filament tow. After being spun, the tow bundle of coagulated polyacrylonitrile aquagel fiber was washed substantially free from salt upon being withdrawn from the coagulating bath and then wet-stretched in three consecutive hot liquid stages for orientation to a total stretched length that was about thirteen times its original extruded length. Each of the hot liquid stages in which the fiber was stretched consisted of a portion of the total mentioned aqueous impregnating bath of the dissolved graft copolymer additive. The first stage had about 1.5 percent of the additive; the second about 0.6 percent, and the last about 0.3 percent. In this way, the fiber became impregnated with the copolymer during its orientation by stretching.

Following the impregnation, the aquagel fiber was irreversibly dried at 150° C. to destroy the water-hydrated structure and convert it to a finished fiber form. The finally obtained fiber product had a tenacity of about 4.5 grams per denier, an elongation of about 26 percent, and a dry yield strength of about 1.0 gram per denier.

The ternary polymer-containing acrylonitrile polymer fiber product was found to be very white and have good luster in addition to having excellent natural stability to heat and light as well as against becoming degraded under the influence of aqueous alkaline media at pH levels as high as 10. It was found to have good resistance to accumulating charges of static electricity upon handling.

In addition, the graft copolymer-containing sample had good hand and was dyeable with all classes of dyestuffs as applied under normal dyeing conditions.

The fiber product dyed well to deep and level shades of coloration with Calcodur Pink 2BL, a direct type of dyestuff (Colour Index Direct Red 75).

The antistatic properties of the ternary polymer-containing fiber were determined by measuring the electrical conductance of the fiber product at two different humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on a common basis, the conductivities of the samples tested were actually measured as volume resistivities according to the following formula:

Volume resistivity
$$= \frac{(Resistance)(cross\text{-}sectional\ area)}{Path\ length\ between\ electrodes\ to\ which\ sample\ being\ tested\ is\ attached}$$

Some of the samples were tested before and after receiving certain other treatments. Thus, a sample of the graft ternary polymer-containing (acid form) polyacrylonitrile fiber prepared in the indicated manner was tested. Other samples, prior to being tested, were treated with one of the following treatments: Subjected to a No. 3–A accelerated wash test according to the Association of Textile Chemists and Colorists (AATCC) Manual; scoured with "Ivory" soap, a commercial white pure medium titer soap made from alkali metal saponification products of fats, for ½ hour at 70° C. rinsed well, and than vat dyed in the conventional manner with Cibanone Brilliant Green BF double paste (Colour Index Vat Green 1); scoured with "Ivory" soap for ½ hours at 70° C., rinsed, and then given 5 AATCC No. 3–A wash tests.

The actual resistivities of the samples were then determined (after the samples being tested were conditioned for seventy-two hours at the particular temperature and relative humidity conditions involved in each of the tests) by tautly connecting a web-like sample of the yarn between two electrodes, each of which was 9 centimeters long spaced parallel 13 centimeters apart, and across which there was applied a 900 volt direct current potential. For purposes of comparison, the volume resistivities of cotton, wool and an unmodified polyacrylonitrile fiber (obtained in the same way as the copolymer-containing fiber but without having the polymeric additament incorporated therein) were also tested in the indicated manner along with the graft copolymer-containing fiber in accordance with the present invention.

The results are set forth in Table I. The volume resistivities obtained at each relative humidity (R.H.) were at 23° C. for each of the samples tested.

Table I

| Sample | Percent relative humidity | Volume resistivity, ohm cm.²/cm. |
|---|---|---|
| Scoured wool | 47 | 2.1×10¹¹ |
|  | 66 | 4.7×10⁹ |
| Scoured cotton | 47 | 2.7×10⁹ |
|  | 66 | 9.7×10⁷ |
| Scoured unmodified polyacrylonitrile fiber | 47 | 8.2×10¹³ |
|  | 66 | 1.4×10¹³ |
| Graft polymer-containing fiber as made | 47 | 7.6×10¹² |
|  | 66 | 7.9×10¹⁰ |
| Graft polymer-containing fiber as made with AATCC No. 3-A wash test | 47 | 5.4×10⁹ |
|  | 66 | 3.3×10⁷ |
| Graft polymer-containing fiber as made with "Ivory" scour and vat dyed | 47 | 4.6×10¹⁰ |
|  | 66 | 2.5×10⁸ |
| Graft polymer-containing fiber as made with "Ivory" scour and 5 AATCC No. 3-A wash tests | 47 | 6.4×10⁸ |
|  | 66 | 1.7×10⁷ |

Thus, it is seen that when the free acid from the graft polymer-containing fiber is converted to the sodium salt, the sodium ions being made available in the above instances from the "Ivory" soap solution and the AATCC No. 3–A wash solution, the antistatic properties of the fibers are greatly improved. Uncommon to the known antistatic agents, which usually decrease in antistatic value from scouring, the antistatic agents of the instant invention increase in antistatic value when scoured with solutions containing alkali metal ions.

EXAMPLE 5

Fiber samples were prepared as in Example 4 except that prior to impregnating the aquagel fibers with the graft ternary polymer, the acid form of the graft polymer was converted to the sodium salt by treating with a mild solution of sodium hydroxide, and then rinsed.

When the fibers were tested for antistatic value, as in Example 4, they had a volume resistivity of about $7.6 \times 10^{12}$ and $7.9 \times 10^{10}$ at relative humidities of 47 and 66 percent, respectively. Thus, about the same antistatic value was obtained as when the acid form of the graft polymer is applied to the fiber.

EXAMPLE 6

Polyacrylonitrile fibers containing about 9.5 percent (owf.) of the polymer product of Example 2 were prepared and treated in accordance with the procedure of Example 4. The resulting fibers were very white and lustrous and had the following physical properties (dry): a tenacity of about 4.9 grams/denier; an elongation of about 24 percent; and a yield point of about 1.05. The fibers dyed to deep shades of pink with Calcodur Pink 2BL.

The antistatic properties of the fibers were determined as in Example 4. "All," a relatively alkaline (from alkali metal salts) commercial synthetic soapless detergent made from a base of alkyl aryl sulfonate and containing a water softener, was used in place of the "Ivory" soap in Example 4. These results are presented in Table II.

Table II

| Sample | Percent relative humidity | Volume resistivity, ohm cm.²/cm. |
|---|---|---|
| Graft polymer-containing fiber as made | 47 | 1.1×10¹² |
|  | 66 | 5×10¹⁰ |
| Graft polymer-containing fiber as made with "All" scour | 47 | 2.6×10¹¹ |
|  | 66 | 1.2×10⁹ |
| Graft polymer-containing fiber as made with AATCC No. 3-A wash test | 47 | 5.6×10⁹ |
|  | 66 | 5.3×10⁸ |
| Graft polymer-containing fiber vat dyed with Cibanone Brilliant Green BF and 5 AATCC No. 3-A wash tests | 47 | 2.9×10⁸ |
|  | 66 | 1.22×10⁷ |

EXAMPLE 7

Polyacrylonitrile fibers containing about 7 percent (owf.) of the polymer product of Example 3 were prepared and treated in accordance with the procedure of Example 4. Again, fibers were obtained that were very white and lustrous and had a good hand.

Antistatic properties of the fibers were determined as in Example 4. The results of these tests are tabulated in Table III.

Table III

| Sample | Percent relative humidity | Volume resistivity, ohm cm.²/cm. |
|---|---|---|
| Graft polymer-containing fiber as made | 47 | 4.5×10¹² |
|  | 66 | 2.0×10¹¹ |
| Graft polymer-containing fiber as made with "Ivory" scour | 47 | 1.7×10¹² |
|  | 66 | 7.2×10¹⁰ |
| Graft polymer-containing fiber as made with with AATCC No. 3-A wash test | 47 | 1.2×10¹¹ |
|  | 66 | 1.5×10⁹ |

Excellent results may also be obtained when the foregoing is repeated employing as additives other ternary polymers of the monomeric polyglycol monoesters of Formula IV with the various carboxylic acid monomers disclosed graft polymerized on polymers of the vinyl lactams of Formula I or the vinyl oxazolidinones of Formula III or the vinyl morpholinones of Formula II.

Results similar to those set forth in the foregoing can similarly be obtained when any of the indicated varieties of polymeric additaments are incorporated in polyacrylonitrile and other acrylonitrile polymer fibers to provide articles in accordance with the present invention by blending the polymeric additaments and the fiber-containing acrylonitrile polymer in a spinning composition or dope prior to its extrusion into filamentary products by either wet spinning or dry spinning techniques. In such instances, incidentally, it may be desirable, in order to secure optimum benefit in the practice of the invention, to employ relatively larger quantities of the polymeric additament than when surface impregnation is performed so that the presence of effective quantities of the additament at or near the peripheral portion of the article is assured.

The vinyl lactam polymers that are utilized in the preparation of the graft polymeric additaments of the present invention may be any of those (or their mixtures) which are variously characterized and generically known to the art as poly-N-vinyl lactams or poly-1-vinyl lactams. Such polymers as have been described or which may be prepared from the mentioned varieties of monomers that are involved in U.S. Patent Nos. 2,265,450; 2,371,804 and 2,335,454 may be suitably employed in the practice of the invention. Advantageously, the poly-N-vinyl lactam that is used for the manufacture of the graft polymers may be one having a Fikentscher K-value between about 30 and about 55. Beneficially, the poly-N-vinyl lactams that are employed are poly-N-vinylpyrrolidone, poly-N-vinylpiperidone, poly-5-methyl-N-vinyl-2-pyrrolidone, or poly-N-vinylcaprolactam, particularly poly-N-vinylpyrrolidone.

Following the immediate foregoing teaching and to illustrate related vinyl lactam monomers falling within Formula II are N-vinyl-5-methyl-3-morpholinone; N-vinyl-6-ethyl-3-morpholinone, etc. Such monomers and their polymers are disclosed in the copending application of Billy E. Burgert, entitled "N-Vinyl-3-Morpholinone Compounds," having Serial No. 692,587, now U.S. Patent No. 2,987,509, that was filed on October 28, 1957.

Similarly illustrative of monomers falling within the Formula III which may be used to form the ternary polymers of the invention in the role of a polymer substrate to serve as a grafting base are N-vinyl-2-oxazolidinone; N-vinyl-4-methyl-2-oxazolidinone; N-vinyl-5-ethyl-2-oxazolidinone, N-vinyl-4,5-dimethyl-2-oxazolidinone; N-vinyl-2-oxazinidinone; etc. These monomers and polymers therefrom are discussed in U.S. Patent Nos. 2,891,058 and 2,919,279.

The monomeric polyglycol monoester compounds of Formula IV that are used for the preparation of polymeric additives in the practice of the present invention are generally relatively non-volatile, clear or lightly colored liquids that have the above-indicated generic structure. Besides being soluble in water, such monomers, as has been indicated, are also soluble in alcohols, chlorinated hydrocarbons and other organic solvents, including ketones, ethers such as diethyl ether, amides, amines, dimethyl formamide and the like. Ordinarily the monomers are not particularly soluble in such liquids as straight hydrocarbon solvents.

The monomeric polyglycol monoester compounds may be prepared by a method which involves condensing an alkyl acrylate or methacrylate with a polyglycol that has a non-reactive terminal end group (or, as may otherwise be stated, has but a single reactive hydroxyl group in its constitution). Preferably, a lower alkyl acrylate or methacrylate is employed such as one in which the alkyl unit contains not more than 4 carbon atoms. The preparation of such monomers may be typified by the following reaction between methyl methacrylate and a polyethylene glycol monomethyl ether.

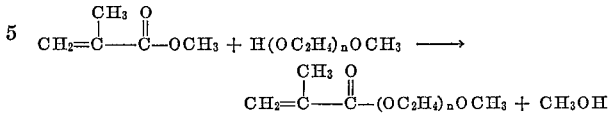

Advantageously, the condensation reaction is accomplished in the presence of an acid catalyst (such as para-toluene sulfonic acid) and a polymerization inhibitor (such as hydroquinone) in order to avoid premature polymerization of the monomer. Generally, an amount of the catalyst up to about 10 percent by weight, based on the weight of the reactants, may be required for the accomplishment of the condensation. Frequently, only 5 percent or less of the catalyst is needed. Usually relatively greater quantities of the catalyst are necessary to employ when the reaction is performed by batch-wise techniques instead of according to continuous processing arrangements. Other catalysts that may be employed include sulfuric acid, phosphoric acid and the like. If desired, the monomer-preparing reaction may be conducted in a suitable solvent vehicle, such as benzene, toluene, ethylene dichloride or carbon tetrachloride.

The reaction may be performed with benefit at temperatures from about 60 to 140° C., depending on the particular solvent employed. Better results in the preparation of the monomer may often be obtained when the temperature is maintained between about 90 and 120° C. The monomeric polyglycol monoester-preparing reaction will occur under any desired pressure. It is generally convenient for it to be conducted under reflux conditions. Ordinarily, good conversions and yields of desired product from the converted starting materials (including 100 percent conversions) can be realized within reaction periods of 20 hours or less. By way of illustration, conversions in the neighborhood of 90 percent or greater of the reactant materials to the desired monomer are not unusual. For many purposes, such as and particularly when the monomer is desired to be converted into polymer products, it is generally unnecessary to isolate the monomer from the reaction mass in which it was prepared. This is for the reason that it can be readily obtained in the reaction mass in a condition in which it is free from interfering impurities by the expedient of removing the unused alkyl acrylate starting material and any polymerization inhibitor that may have been employed.

As is apparent, the monomeric polyglycol monoester compounds used in the practice of the present invention may advantageously be prepared from particular varieties of polyethylene glycols although, if desired, beneficial results may be obtained when they are manufactured from polyglycols of a similar type that are comprised of mixtures of oxyethylene and oxypropylene uits.

Among the representative polymerizable monoethylenically unsaturated aliphatic carboxylic acids that may be utilized in the preparation of the ternary polymers of the present invention, besides the specifically illustrated acrylic acid, are methacrylic acid, crotonic acid, maleic acid, fumaric acid, itaconic acid, citraconic acid, mesaconic acid, etc.

The graft polymers of the present invention may be prepared by various methods of polymerization, including those procedures which have been demonstrated in the foregoing illustrative examples. High energy irradiation, simple heating or evaporation of the monomer-containing polymerization mixture may oftentimes be resorted to with advantage for preparation of the graft copolymers. The ternary graft polymers may be prepared in either aqueous or organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 10 to 60 hours.

Compositions of the polymeric additaments in accordance with the present invention can vary within rather wide limits. The content of the monomeric constituents to be graft polymerized may advantageously be between about 10 and 80 weight percent of the ternary polymer. The polymer substrate upon which the monomers are grafted may advantageously be between about 90 and 20 weight percent of the ternary polymer composition.

It is frequently desirable for about commensurate weight proportions of the substrate polymer and the monomeric constituents graft copolymerized thereto to be obtained in the graft polymeric product.

It is advantageous for from about 85 to 99 weight percent of the mixture of monomers to be comprised of the monomeric acrylate or methacrylate polyglycol monoester. It is generally more desirable and of greater advantage in such instances for the mixtures of monomers that are graft polymerized on the polymer substrate to be comprised of from 90 to 95 weight percent of the monomeric polyglycol monoester.

The polymerization system that is employed for the preparation of any of the polymeric products of the present invention may consist of as much as 50 percent by weight of the mixture of monomers and substrate polymers to be polymerized in the aqueous or other medium. The amount of polymerizable constituents that are provided in the graft polymerization system may be influenced somewhat by the manner in which it is intended to incorporate the product in the synthetic polymer compositions in order to provide the polymer-containing acrylonitrile polymer compositions of the invention.

If, for example, it is intended to incorporate the polymer product by blending into a fiber-forming composition prior to its fabrication into shaped articles, the polymerization system may, if desired, contain about equal proportions by weight of the charged polymerizing constituents and the polymerization medium which, preferably, is miscible with and tolerable in the spinning solution solvent intended to be used. In such cases, the polymer product may ordinarily be readily isolated from unreacted monomer and directly incorporated in the fiber-forming composition. If the incorporation of the polymeric additive in a fiber-forming composition is to be achieved by impregnation therewith of an already-formed shaped article of the composition, it may be desirable to effect the polymerization so as to directly form a suitable applicating solution (or suspension in the cases where a non-solvent polymerization vehicle is employed) of the polymeric additament product. For such purposes, the polymerization system may be prepared to contain as little as 5 to 10 percent by weight of the polymerizing ingredients. Such a method for preparing the polymeric products may be especially appropriate when they are intended, in the practice of the present invention, to be applied to acrylonitrile polymer fibers and the like that are derived from aquagels in the course of their manufacture, such as acrylonitrile polymer fibers that are wet spun from aqueous saline solutions of the fiber-forming polymer.

In such instances, as has been demonstrated, the polymeric additament may be impregnated into the fiber from aqueous solution while the fiber is in a swollen or gel condition, as a polyacrylonitrile fiber in an aquagel condition, in order to obtain the desired polymer-containing product.

If desired, the polymer-containing acrylonitrile polymer compositions may comprise as much as 20 or more percent by weight of the graft polymeric additament, based on the weight of the composition. Usually, however, suitable properties and characteristics and better fiber-forming properties in a given composition may be achieved when lesser proportions of the polymeric additament are incorporated therein. An appreciable improvement in dye-receptivity, antistatic properties and stability may frequently be obtained when a quantity of the polymeric additament that is as small as 2 (and even as low as 1 or less) percent by weight is employed. Advantageously, an amount between about 5 and 12 percent by weight of the polymeric additament may thus be utilized in the composition. Greater advantages may often accrue when the amount of the polymeric additament that is incorporated in the composition is in the neighborhood of 6–10 percent by weight, based on the weight of the composition.

As has been indicated, the polymeric additaments may be incorporated in the acrylonitrile polymer compositions according to various techniques. Thus, for example, the polymeric additament and the acrylonitrile polymer may be directly blended in order to provide the composition which, incidentally, may be used for any desired fabrication purpose in addition to fiber-forming and the like. Beneficially, the polymeric additives and the acrylonitrile polymers may be comminuted, either separately or in combination, before being intimately blended together by mechanical or other means. The blended polymers may be prepared into suitable fiber-forming system by dissolving or otherwise dispersing them in a suitable liquid medium. Or, the compositions may be provided in fiber-forming system by sequentially dispersing the diverse polymers in any desired order in a suitable medium, as by incorporating the polymeric additament in a prepared acrylonitrile polymer spinning solution, dope or the like. Suitable acrylonitrile polymer fiber-forming systems are disclosed, among other places, in United States Letters Patents Nos. 2,140,921; 2,425,192; 2,570,237; 2,643,990; 2,648,592; 2,648,593; 2,648,648; 2,648,649; and 2,949,435.

As is evident from the illustrative examples heretofore included, a highly advantageous technique for providing the compositions, particularly when acrylonitrile polymer fibers products are involved, is to apply or impregnate the polymeric additament from a dissolved aqueous dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition for Rendering Polyacrylonitrile Readily Dyeable," having Serial No. 333,385, which was filed on January 26, 1953, now abandoned. Thus, an acrylonitrile polymer filamentary article that has been spun from an aqueous saline solution may be conveniently passed, after is coagulation and while it is in an aquagel condition, through a water bath containing the dissolved polymeric additament in order to impregnate the filament with the polymer product and provide a composition and an article in accordance with the invention. In addition, if desired, in situ polymerization techniques may also be relied upon to provide certain forms of the polymeric additament in the acrylonitrile polymers in either fabricated or unfabricated form.

The compositions employed in the practice of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbon, tapes, films, foils, sheets and the like which may be manufactured from synthetic polymeric materials.

It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer.

Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

As has been indicated, after the ternary polymer antistatic agent is applied to the shaped article the free acid form of the polymerized carboxylic acid is converted, at least partially and preferably totally, to an alkali metal salt of the acid. This can be accomplished by subjecting the treated shaped article to intimate contact with a solution or dispersion containing available alkali metal ions that may react with the free acid of the graft ternary polymer.

Conveniently, this solution containing the suitable alkali metal ions is an aqueous solution containing a commercial soap or detergent having in its composition alkali metal salts. Frequently, for instance, these are various sodium sulfonate compositions. Or, the ternary-polymer-containing articles may be treated with mild alkali solutions, such as dilute aqueous solutions of sodium or potassium hydroxide to convert the free acid to an alkali metal salt in accordance with the invention.

The treatment of the shaped article containing the free acid form of the graft ternary polymer to convert the acid to an alkali metal salt is preferably performed after the treated article has been dried. That is, after applying the polymer to the shaped article, the article is dried prior to being treated to convert the free acid to an alkali metal salt. This is particularly so, as has been demonstrated, when the polymeric additament is applied to an acrylonitrile polymer aquagel. In this case, it is preferable before the acid converting treatment that the aquagel be irreversibly dried. Satisfactory results may be obtained, however, if the interposed drying step is not used.

The modified and polymer additive-containing acrylonitrile polymer fiber products in accordance with the present invention have excellent physical properties and other desirable characteristics for a textile material. They are excellently provided with permanent resistance to accumulating static charges since the alkali metal salt form of the acid can be readily replenished during home launderings.

Various changes in the practice of this invention may readily be made without substantially departing from its spirit or scope. It is to be understood, therefore, that all the foregoing be interpreted as being merely illustrative and in no sense or manner limiting or restrictive of the invention as it is particularly pointed out and defined in the appended claims.

What is claimed is:

1. Method for preparing essentially free of static charge build-up a shaped article fabricated from a polymer composition which comprises intimately blending a major proportion of at least about 80 weight percent, based on the weight of the composition of (A) an ethylenically unsaturated monomeric material containing at least about 80 weight percent of polymerized acrylonitrile with (B) from about 1 to 20 weight percent, based on the weight of the composition, of a graft ternary polymeric additament of (a) from about 90 to 20 weight percent, based on the weight of the polymeric additament, of a substrate polymer selected from the group consisting of a poly-N-vinyl lactam, and a poly-N-vinyl-2-oxazolidinone upon which is graft polymerized (b) from about 10 to 80 weight percent, based on the weight of the polymeric additament, of a mixture of (1) from about 85 to 99 weight percent, based on the weight of the mixture, of a monomeric polyglycol monoester of the formula:

$$CH_2=CZCO(OC_2H_4)_n(OC_3H_6)_mX$$

wherein Z is selected from the group consisting of hydrogen and methyl; X is selected from the group consisting of halogens of atomic number 17 to 53, alkoxy radicals containing from 1 to 2 carbon atoms and thioalkyl radicals containing from 1 to 2 carbon atoms; $n$ is a number having an average value of from 5 to 100; and $m$ has a value from 0 to 10; and (2) from about 15 to 1 weight percent, based on the weight of the mixture, of a polymerizable monoethylenically unsaturated aliphatic carboxylic acid monomer selected from the group consisting of a mono- and di-carboxylic acid monomer containing from 3 to about 12 carbon atoms in the monomer molecule; subjecting said composition to a fabrication treatment to prepare a shaped article thereof; and subsequently, intimately contacting the shaped article with an aqueous solution having available alkali metal ions to convert, at least partially, the free acid of said mono-ethylenically unsaturated carboxylic acid to an alkali metal salt.

2. The method of claim 1, wherein said acrylonitrile polymer is polyacrylonitrile.

3. The method of claim 1, wherein said substrate polymer is a poly-N-vinyl lactam.

4. The method of claim 3, wherein said poly-N-vinyl lactam is poly-N-vinyl pyrrolidone.

5. The method of claim 3, wherein said poly-N-vinyl lactam substrate polymer is a poly-N-vinyl-3-morpholinone polymer.

6. The method of claim 5, wherein said poly-N-vinyl-3-morpholinone polymer is poly-N-vinyl-3-morpholinone.

7. The method of claim 1, wherein said substrate polymer is a poly-N-vinyl-2-oxazolidinone.

8. The method of claim 7, wherein said poly-N-vinyl-2-oxazolidinone is poly-N-vinyl-5-methyl-2-oxazolidinone.

9. The method of claim 1, wherein said monomeric polyglycol monoester is a methoxy-polyethylene glycol methacrylate in which the polyethylene glycol constituent has a molecular weight of about 1200.

10. The method of claim 1, wherein said polymerizable mono-ethylenically unsaturated carboxylic acid is acrylic acid.

11. The method of claim 1, wherein said polymerizable mono-ethylenically unsaturated carboxylic acid is methacrylic acid.

12. The method of claim 1, wherein said alkali metal ion is a sodium ion.

13. Method for preparing an acrylonitrile polymer fiber essentially free of static charge build-up comprising impregnating an aquagel fiber of an ethylenically unsaturated monomeric material containing at least about 80 weight percent of polymerized acrylonitrile, with from about 1 to 20 weight percent, based on the weight of the resulting fiber, of a graft ternary polymeric additament of (a) from about 90 to 20 weight percent, based on the weight of the polymeric additament, of a substrate polymer selected from the group consisting of a poly-N-vinyl lactam, and a poly-N-vinyl-2-oxazolidinone upon which is graft polymerized (b) from about 10 to 80 weight percent, based on the weight of the polymeric additament, of a mixture of (1) from about 85 to 99 weight percent, based on the weight of the mixture, of a monomeric polyglycol monoester of the formula:

$$CH_2=CZCO(OC_2H_4)_n(OC_3H_6)_mX$$

wherein Z is selected from the group consisting of hydrogen and methyl; X is selected from the group consisting of halogens of atomic number 17 to 53, alkoxy radicals containing from 1 to 2 carbon atoms and thioalkyl radicals containing from 1 to 2 carbon atoms; $n$ is a number having an average value of from 5 to 100; and $m$ has a value from 0 to 10; and (2) from about 15 to 1 weight percent, based on the weight of the mixture, of a polymerizable mono-ethylenically unsaturated aliphatic carboxylic acid monomer selected from the group consisting of a mono- and di-carboxylic acid monomer containing from 3 to about 12 carbon atoms in the monomer molecule; irreversibly drying said impregnated acrylonitrile polymer aquagel fiber to a characteristically hydrophobic textile fiber; and subsequently intimately contacting said dried fiber with an aqueous solution having available alkali metal ions to convert, at least partially, the free acid of said mono-ethylenically unsaturated carboxylic acid to an alkali metal salt.

14. The method of claim 13, wherein said acrylonitrile polymer is polyacrylonitrile.

15. The method of claim 13, wherein said substrate poly-N-vinyl lactam polymer is poly-N-vinyl-pyrrolidinone.

16. The method of claim 13, wherein said substrate poly-N-vinyl-2-oxazolidinone polymer is poly-N-vinyl-5-methyl-2-oxazolidinone.

17. The method of claim 13, wherein said substrate poly-N-vinyl-3-morpholinone polymer is poly-N-vinyl-lactam.

18. The method of claim 13, wherein said polymerizable mono-ethylenically unsaturated carboxylic acid is acrylic acid.

19. The method of claim 13, wherein said polymerizable mono-ethylenically unsaturated carboxylic acid is methacrylic acid.

20. The method of claim 13, wherein said alkali metal ion is a sodium ion.

References Cited in the file of this patent
UNITED STATES PATENTS
2,999,056   Tanner ---------------- Sept. 5, 1961